United States Patent [19]

Kempter et al.

[11] Patent Number: 5,017,641

[45] Date of Patent: May 21, 1991

[54] PREPARATION OF AQUEOUS NONWOVEN BINDERS OF LOW FORMALDEHYDE EMISSION ON CURING BASED ON UREA, FORMALDEHYDE AND GLYOXAL

[75] Inventors: Fritz E. Kempter, Mannheim; Franz Matejcek, Lambsheim; Werner Neubach, Ludwigshafen; Klaus Flory, Leimen, all of Fed. Rep. of Germany

[73] Assignee: BASF Aktiengesellschaft, Ludwigshafen, Fed. Rep. of Germany

[21] Appl. No.: 347,437

[22] Filed: May 2, 1989

[51] Int. Cl.$^5$ .............................................. C08G 12/12
[52] U.S. Cl. ..................................... 524/598; 528/245
[58] Field of Search ......................... 524/598; 528/245

[56] References Cited

U.S. PATENT DOCUMENTS

| | | | |
|---|---|---|---|
| 2,574,114 | 11/1951 | Lehmann et al. | 528/254 |
| 2,876,062 | 3/1959 | Torke et al. | 528/245 |
| 3,049,446 | 8/1962 | Goldstein et al. | 528/245 |
| 3,801,546 | 3/1974 | Petersen et al. | 528/245 |
| 3,862,224 | 1/1975 | Petersen et al. | 528/245 |
| 4,198,462 | 4/1980 | Dixon et al. | 428/290 |

FOREIGN PATENT DOCUMENTS 1207980 10/1970 United Kingdom .
1487286 9/1977 United Kingdom .

*Primary Examiner*—Morton Foelak
*Assistant Examiner*—Frederick Krass
*Attorney, Agent, or Firm*—Oblon, Spivak, McClelland, Maier & Neustadt

[57] ABSTRACT

Aqueous nonwoven binders that give reduced formaldehyde emission on curing are based on condensation products of urea or derivatives thereof, formaldehyde and glyoxal in a molar ratio, based on the solid binder, of from 1.5 to 2.5 moles of formaldehyde and from 0.1 to 0.5 mole of glyoxal per mole of the total urea used.

7 Claims, 1 Drawing Sheet

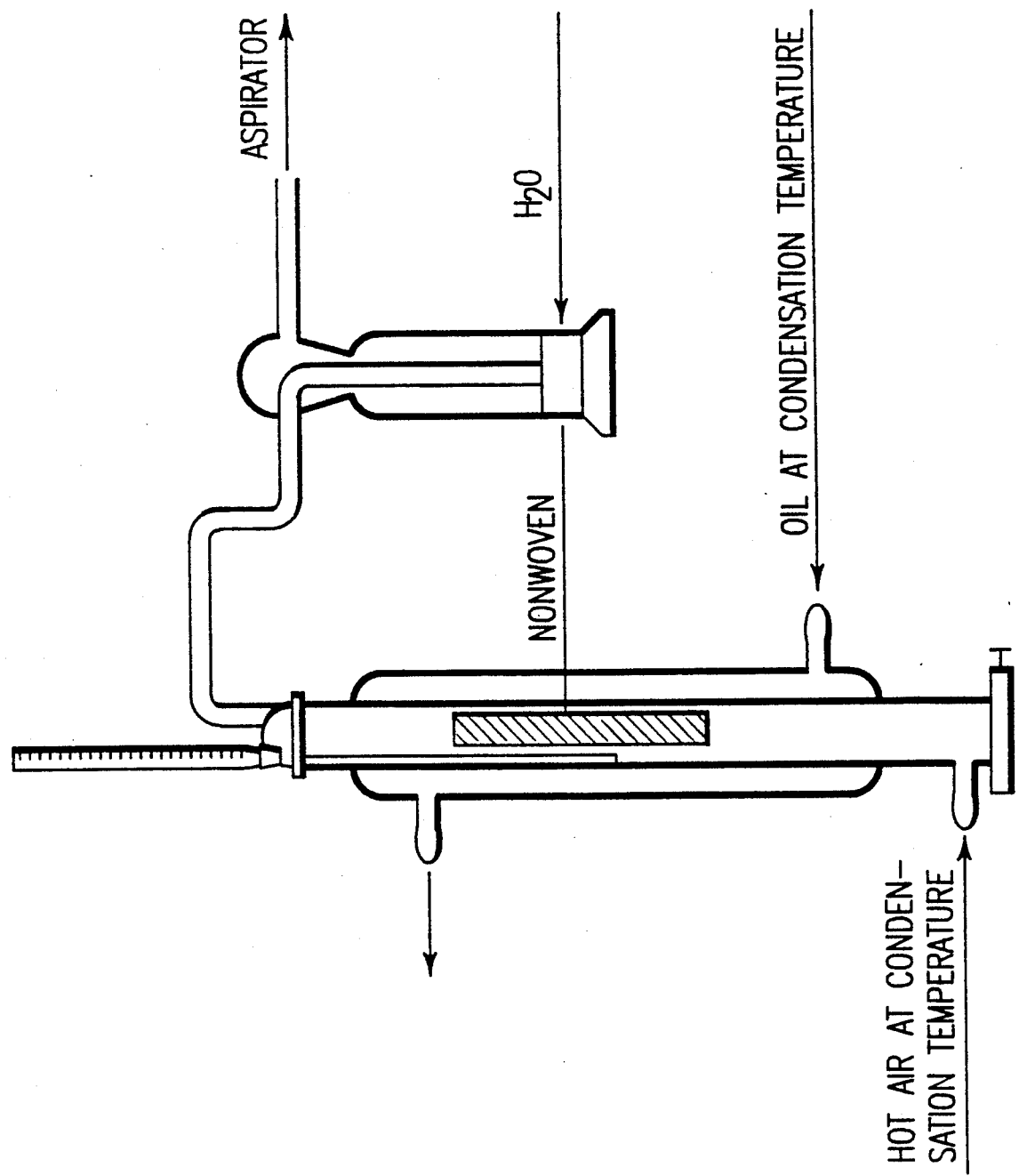

PREPARATION OF AQUEOUS NONWOVEN BINDERS OF LOW FORMALDEHYDE EMISSION ON CURING BASED ON UREA, FORMALDEHYDE AND GLYOXAL

The present invention relates to a process for preparing aqueous nonwoven binders of reduced formaldehyde emission on curing that are based on condensation products of urea or derivatives thereof, formaldehyde and glyoxal in a molar ratio, based on the solid binder, of from 1.5 to 2.5 moles of formaldehyde and from 0.1 to 0.5 mole of glyoxal per mole of the total urea used; to the nonwoven binder; and to the use thereof.

This process gives rise to $H_2N—CO—$ or $R—NH—CO—$ terminated urea-formaldehyde resins (R being part of a ring) that contain 4,5-dihydroxyethyleneurea groups I with or without urone groups II.

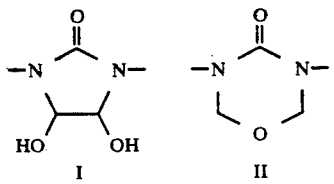

Processes for preparing urea-formaldehyde resins that contain 4,5-dihydroxyethyleneurea groups and urone groups are known. Such condensates are used in the textile industry for the resin finishing of cellulose-containing fabrics.

For instance, JP 67/5,114 describes a uronyl-containing textile assistant from urea, formaldehyde and glyoxal in a molar ratio of 1:(3.5–5.5):(0.05–0.5). U.S. Pat. No. 4,198,462 discloses uronyl-containing textile assistants with a urea-formaldehyde-glyoxal molar ratio of 1:(2.8–3.5):(0.18–0.55) and a free formaldehyde content of <2% by weight. DD Patent 212,761 describes textile assistants having a urea-formaldehyde-glyoxal molar ratio of 1:(1.5–2.5):(0.6–0.8). DE Patent No. 2,520,005 describes uronyl-containing textile assistants with a urea-glyoxal molar ratio of 1:0.15. GB Patent No. 1,207,980 utilizes reaction products of urea and glyoxal that have been reacted with formaldehyde for the impregnation of polyamide fibers. ZA Patent No. 8,505,290 and DE Patent No. 2,152,705 disclose textile assistants formulated as combination products of glyoxal, formaldehyde, urea and ethylene glycol. Textile assistants having a low level of free formaldehyde (<2.5%), from urea, formaldehyde and glyoxal, are proposed in DE Patent No. 2,363,203. Finally, DE Patent No. 2,210,283 describes a three-stage process for preparing durable textile finishes in the form of a uronyl-containing or -free product of urea, formaldehyde and glyoxal in a total molar ratio of 1:(1.5–2.5):(0.3–0.6) where urea and glyoxal are added in a molar ratio of 1:1 in the third stage and condensed at pH 5.0–7.0, with the idea of reacting the excess formaldehyde with the reaction product of urea and glyoxal to give dimethylol-4,5-dihydroxy-2-imidazolidinone. Furthermore, DE-A-No. 2,453,250 describes easy care finishes for textiles, formulated from urea, formaldehyde, glyoxal and primary amines.

All cited products and the processes for preparing the same have in common the feature that the reaction with glyoxal, or the condensation of the corresponding reaction products, is carried out at a pH of from 5.0 to 7.0. This feature is based on the experience that products which are converted or condensed under more extreme pH conditions typically lose the desirable application characteristic of a textile fabric hand. Moreover, the products contain a undesirably high level of free formaldehyde. Where attention is drawn to the low levels of free formaldehyde, values of <1.5–2.0% by weight are reported. Regardless of what happens to the incorporated formaldehyde of the condensation products on curing itself, an appreciable proportion of the emitted formaldehyde must come from the free formaldehyde.

It is an object of the present invention to provide mineral and textile nonwoven binders which have not only a low level of free formaldehyde but also a low level of thermally eliminable formaldehyde. It is another object that the products should preferably be thinnable with water in any ratio to clear dilutions down to very low concentrations and have such a storage and pH stability as to ensure industrial utility.

We have found that these objects are achieved by a process for preparing a nonwoven binder on the basis of a urea-formaldehyde resin that contains 4,5-dihydroxyethyleneurea groups with or without urone groups. The present invention accordingly provides a process for preparing an aqueous nonwoven binder of reduced formaldehyde emission on curing that is based on a condensation product of urea or a derivative thereof, formaldehyde and glyoxal in a molar ratio, based on the solid binder, of from 1.5 to 2.5 moles of formaldehyde and from 0.1 to 0.5 mole of glyoxal per mole of the total urea used, which comprises (A) condensing urea and formaldehyde in an aqueous solution in a molar ratio of 1:(2.0–10) at a pH of from 1 to 10 and at from 20° to 95° C., (B) condensing with glyoxal in a molar ratio of urea:glyoxal of 1:(0.1–0.5) at a pH of from 2.0 to 6.8 and at from 60° to 100° C. and (C) further reacting with such an amount of urea, 2-oxohexahydro-1,3,5-triazine or a 2-oxo-4,6-dialkylhexahydro-1,3,5-triazine in an amount, based on the solid binder, of from 2 to 20% by weight, based on the unsubstituted urea or the urea used for preparing the triazine, at a pH of from 5.0 to 8.5 and at from 20° to 100° C., and with up to 70% by weight of glyoxal, based on the total amount of glyoxal, as to produce the stated overall molar ratio.

There now follow specifics concerning the individual stages (A), (B) and (C):

For the reaction of the first process stage (A) it is possible to ureas in solid form or as solution and formaldehyde in solution or in the form of pure polymers, for example paraformaldehyde, trioxane or tetroxane, and also in the form of pure acetates. In place of urea it is of course also possible to use derivatives thereof, such as the methylolation mixtures of urea with formaldehyde, which, besides free formaldehyde, also contain, inter alia, the higher methylol compounds of urea, ie. tri- and tetramethylolurea, as starting materials. The preference is given to using Formol ®50 from BASF, which is a precondensate of 50% by weight of formaldehyde, 25% by weight of urea and 25% by weight of water.

In stage (A), urea is reacted with formaldehyde in a molar ratio of 1:(2–10), preferably 1:(2.1–2.5), at a pH of from 1 to 10. If a urone ring is to be formed, this can be done at pH 1–3 and at pH 8.5–10, if appropriate excess amounts of formaldehyde are used. The molar ratio of urea:formaldehyde is then 1:(4–10), preferably 1:(4–6). The urea/formaldehyde ratio corresponding to the overall molar ratio is obtained by subsequent addition of urea. In the pH range 1-3, inorganic and organic acids such as sulfuric acid, formic acid and phosphoric acid are used. Sulfuric acid is preferred. The pH range 8.5-10 is set with inorganic or organic bases, such as sodium hydroxide solution, calcium hydroxide solution or triethanolamine. Triethanolamine is preferred. The reaction temperatures for the condensation range from 20° to 95° C., preferably from 60° to 95° C. For the purposes of the process described herein, the condensation to form a urone ring is a preferred measure. The degree of uronation is from 3 to 30% by weight, preferably from 6 to 25% by weight, based on the total amount of urea. Since urone formation presupposes high excess quantities of formaldehyde, it is necessary thereafter to react with further urea in such amounts that the molar ratio of urea:formaldehyde comes to lie within the above-mentioned range of from 1:2.1 to 1:2.5. This reaction is in general carried out at a pH of from 4 to 8.5 with the urea being methylolated. If a uronation or methylolation is carried out at an alkaline pH, the pH should be continuously readjusted in the course of the reaction by addition of hydroxide solution. The reaction time varies with the temperature and pH from 30 minutes to 4 hours. The end of the reaction is in general evident from the fact that the condensation of free formaldehyde becomes constant. The degree of uronation is determined in a conventional manner by Raman spectroscopy. Urone ring formation not only distinctly reduces formaldehyde emission but also improves the stability properties.

The condensation of the second process stage, stage (B), is carried out with the addition of glyoxal. This glyoxal can be added immediately and all at once or a little at a time in multiple portions, or the addition may be preceded by a certain period at pH 4.0-6.0 to obtain a certain degree of condensation. The portionwise addition of glyoxal results in the products according to the invention having improved solubility in water. The degree of condensation here can be varied within a wide range. It is limited only by the decrease in the water solubility. The ring formation with glyoxal is carried out at from 60° to 90° C. and at a pH of from 5 to 6. Thereafter condensation is continued at a pH of from 2 to 4, preferably from 2.5 to 3.5, and at from 80° to 100° C. for from 30 minutes to 3 hours.

The condensation at pH 2-4 carried in the second part of this stage (B) differs from the corresponding process stage of DE Patent No. 2,210,283 by the different pH range within which this condensation is to be carried out. In the German Patent mentioned, a pH range of from 5 to 7 is specified. Only the subsequent condensation of the predominant dimethylol-4,5-dihydroxyethyleneurea product under severe conditions by the measures of the third stage (C) to be described hereinafter confirms the desired stability properties of the product according to the invention.

To monitor the progress of this condensation reaction, it is possible to use the usual methods, such as viscosity measurement. It is particularly useful to monitor the cloud point of the reaction solution on addition of a 25% strength by weight solution of magnesium sulfate. As the condensation progresses, the onset of cloudiness is found to occur at increasingly lower ratios of reaction solution:magnesium sulfate solution. In general, the condensation is discontinued at a ratio of 1:(0.6-1.6), preferably 1:(1.1-1.3), and as in Examples 1 to 3. The level of free formaldehyde after this step is from 1 to 5% by weight, based on the solid resin.

Depending on the amount of glyoxal used, the cloud points correspond to very different limits to the dilution with fully demineralized water. In general, unlimited water dilutability is desired at this point of the process. The lower limit may be taken to be a range of from 1:15 to 1:30, provided that the measures of the subsequent process stage make it possible to process the end product as, say, from 10 to 20% strength by weight solution.

A modified procedure in the second part of stage (B) comes into consideration if the precondensation of the urea resin from the first stage is continued to higher degrees of condensation. In this case, the reactions of the second process stage are reduced to the cyclizing incorporation of the glyoxal into the precondensation product. This version of the process is characterized by the increase in the water solubility and the decrease in the viscosity of these condensation products during the reaction. Since in this version the condensation is not continued after the cyclization, the reaction can in general be carried out at a pH of from 4 to 6.8. Owing to the advantage of a lower salt burden and shorter reaction times and because of the possible reduction in the amount of glyoxal, this version is a preferred embodiment within the process according to the invention (Examples 4 and 5).

The precondensates from stage (B) still contain free formaldehyde within the range from 1.0 to 5.0% by weight, preferably from 1.5 to 4.0% by weight, but in general no longer contain any free glyoxal. The question of what happens to any residual amounts still present will be discussed in the context of process stage (C).

In the third process stage (C), the reaction mixture has added to it urea and/or 2-oxohexahydro-1,3,5-triazine and/or the reaction product of dimethylolurea and ammonia with or without urea and/or 2-oxo-4,6-dialkylhexahydro-1,3,5-triazine in an amount, based on the solid binder, of from 2 to 20% by weight, preferably from 3 to 15% by weight, particularly preferably from 4 to 10% by weight, based on the unsubstituted urea or the urea used for preparing the urea derivatives. If desired, it is also possible to add ethyleneurea and propyleneurea to the reaction mixture. In the third process stage, the reaction is carried out at from 20° to 100° C. and at a pH of from 5.0 to 8.5 for from 1 to 10 hours. In general, the main part of the reaction takes place during the cooling phase of the batch. It is possible here to include glyoxal in an amount of from 0 to 70% by weight, preferably from 0 to 30% by weight, based on the total amount of glyoxal. However, this is only indicated if a minimum ratio of urea:glyoxal of from 1:(1.5-2.2) was used in stage (B). It is only in the case of these or higher urea:glyoxal ratios that the subsequent addition of additional amounts of glyoxal within the stated limits is advisable. The exact dosage depends on the overall recipe. This measure is limited for example to affecting the stability of the pH of the binder according to the invention within the pH range from 6.8 to 7.3; its advantage is a particularly strong formaldehyde emission reduction on curing.

In process stage (C), the indicated components are added in such amounts as to give an overall molar ratio of urea:formaldehyde:glyoxal of 1:(1.5-2.5):(0.1-0.5), preferably 1:(1.5-2.0):(1.50.4). In calculating these ratios, the urea derivatives are included by including only the urea used for preparing them.

The present invention is based on the surprising finding that the precondensates from stage B) which still contain free formaldehyde are converted by the third process stage (C) into stable products. Stable products for the purposes of the present invention are those which over a period of from 6 weeks to 6 months do not undergo significant changes in water thinnability and are free from precipitates. These products, which have very low free formaldehyde levels of from 0.05 to 1% by weight, preferably from 0.1 to 0.5% by weight, based on the solid resin, and, if urea is used, a free formaldehyde content which, following equilibration, is in general <1% by weight, show much reduced formaldehyde emission on curing coupled with a long shelf life (thinnability) that ensures industrial utility, evidenced by the fact that for long stretches of a storage period no cloudiness appears or, if it does, it does so only after some time and is so slight as not to restrict the usefulness of the product.

The pH of the products according to the invention is in general adjusted by means of bases such as sodium hydroxide solution, calcium hydroxide solution and amines. Here preference is given to the last possibility of using alkanolamines, 2-oxo-5-alkyl-1,3,5-hexahydrotriazines, especially triethanolamine, carbamated triethanolamine or 5-hydroxyethyltriazine, 2-oxo(4,6-dialkyl)-hexahydro -1,3,5,-triazines and the reaction product of dimethylolurea and ammonia. Using these bases the products are in general adjusted to a pH of from 5.0 to 8.5.

A possible way of modifying the binders prepared by the process according to the invention is to add compounds that carry alcoholic OH groups in amounts of from 1 to 30% by weight, for example methanol, ethanol, ethylene glycol, diethylene glycol and triethanolamine and the acetone-formaldehyde condensation products described in German Applications Nos. P 37 07 689.2 and P 37 07 691.4, which may also be added subsequently.

The nonwoven binders prepared by the process according to the invention have a solids content of from 50 to 65% by weight and a slightly yellow color, depending on the amount of glyoxal used. The level of free formaldehyde is from 0.1 to 0.6% by weight, based on the solid resin, if the starting materials are used in the preferred ratios.

The amounts of formaldehyde emitted on curing, as measured by a method described in the context of the Examples, range from 0.1 to 1.0% by weight, preferably from 0.15 to 0.5% by weight, based on the solid resin, depending on the amount of urea used in the third process stage (C), compared with from 10 to 50% by weight formaldehyde emission from commercial nonwoven binders based on urea and formaldehyde.

The formaldehyde emitted on curing was determined under conditions comparable to those encountered in practical processing. However, the results did not permit a direct comparison with industrial practice, since there can be very large differences between users, for example in curing conditions and in the choice of catalyst. However, the values are comparable with those of commercial products. The description of the apparatus and a method for determining formaldehyde emitted in the curing of nonwovens are presented at the end of the Examples.

To cure the products according to the invention, it is possible to use inorganic and organic acids and latently acidic catalysts and metal salts. Preference is given to phosphoric acid, p-toluenesulfonic acid, ammonium chloride, ammonium hydrogenphosphate and the nitrates, chlorides and acetates of magnesium and calcium. The binders are cured on the substances under customary conditions, for example at from 120° to 250° C. over 1-30 minutes.

The aqueous resin solutions are suitable for use as coating agent, impregnating agents and binders for fibrous webs and for the wet strength enhancement of paper. The fibrous webs can consist of natural or synthetic organic fibers, for example polyamides, polyethylene terephthalate, polypropylene, cellulose and/or viscose, and mineral fibers, for example rock wool and in particular glass fibers, the fibers being of customary length and thickness. In the bonding of webs, the resin solutions prepared according to the invention are in general used in a concentration of from 10 to 25% by weight and applied by impregnating the webs, for example by guiding the webs through a bath of the impregnating resins and then squeezing them off in a conventional manner. The webs can also be sprayed with the resin solutions or treated with foamed resin solutions. The impregnated webs are then first dried or heat treated directly in a conventional manner at from 150° to 250° C. for from 2 to 20 minutes, in the course of which the resins become cured. The products according to the invention have a free formaldehyde content of from 0.05 to 0.6% by weight, based on the solid binder. The emitted amounts of formaldehyde eliminated during curing can be down to values of from 0.1 to 0.2% by weight, based on the solid resin, if the products were produced in the preferred ratios.

The nonwovens bonded with the binders according to the invention are up to the required standard in other technological properties. The shelf life can be influenced as desired as a function of the ratios between the starting materials. It is from 6 weeks up to ½ year. The stability of the dilute solutions or liquors of the nonwoven binder prepared according to the invention which have been admixed with one of the acidic catalysts mentioned is better by a factor of from 2 to 4 than that of previously customary liquors containing for example prior art methylolated ureas (up to 24 hours instead of the previous 6 hours), in special cases even higher still.

EXAMPLE 1

To 888.0 g of Formol® 50 (a precondensate from BASF consisting of 50% by weight of formaldehyde, 25% by weight of urea and 25% by weight of water) were added 1.85 g of 35% strength by weight sulfuric acid at 75° C., and the mixture was maintained at 90° C. for 30 minutes. A sample then contained 14% by weight of uronated urea. The pH was adjusted with calcium hydroxide solution to 7.4, and 200 g of urea were then added for methylolation at pH 8.0 and 80° C. over 20 minutes. After 72 g of diethylene glycol had been added, the pH was adjusted with 10% strength by weight sulfuric acid to 5.0, and condensation was allowed to proceed at 80° C. for about 1 hour until a sample of the condensate to which 25% strength by weight magnesium sulfate solution had been added became cloudy on dilution to 1:1.7. 405 g of 40% strength by weight glyoxal solution were then added and made to react at pH 5.6 for about 30 minutes. The final degree of condensation was set by adding 75% strength by weight sulfuric acid (pH 2.8) and reacting the solution at 96° C. until a sample to which 25% strength by weight magnesium sulfate solution had been added became cloudy at a mixing ratio of 1:1.1. The level of free glyoxal was 0% by weight. The pH was then adjusted with calcium hydroxide solution to 5.6, and the temperature to about 70° C., and 90.0 g of urea were added. The pH was repeatedly adjusted within calcium hydroxide solution to a value of 7.1, and the mixture was then filtered. 1595 g of the binder solution having a solids content of 61% by weight was found 24 hours later to contain 0.23% by weight of free formaldehyde, to have a viscosity of 155 mPas at 30° C. (measured with an ICI viscometer) and to be dilutable in any ratio with fully demineralized water. The emitted formaldehyde values measured at 170° C. over 7 minutes and the shelf life values are given in the Table.

EXAMPLE 2

888.0 g of Formol 50 were uronated as in Example 1 and methylolated with 200.0 g of urea as described. The pH was set with 10% strength by weight sulfuric acid at 6.0, 72.0 g of ethylene glycol and 195.0 g of 40% strength by weight aqueous glyoxal solution were added, and the mixture was stirred at pH 5.6 and 80° C. for 30 minutes. The level of free glyoxal was 0% by weight. Thereafter 130 g of 40% strength by weight aqueous glyoxal solution were added and further reacted as described above, after 20 minutes the pH was adjusted to 3.1 with 75% strength by weight sulfuric acid, and the reaction of the solution was continued at 96° C. until a sample to which 25% strength by weight magnesium sulfate solution had been added became cloudy at a mixing ratio of 1:1.25. The level of free glyoxal was 0% by weight, and the level of free formaldehyde 1.75% by weight. The solution was then adjusted with calcium hydroxide solution to pH 5.6, 75.0 g of urea and 80.0 g of 40% strength by weight aqueous glyoxal solution were added, and the solution was stirred at pH 5.6 at 80° C. for 30 minutes. The pH was repeatedly adjusted with calcium hydroxide solution to 7.2, and the solution was then filtered.

1597 g of the binder solution with a solids content of 61.4% by weight had a free formaldehyde content of 0.48% by weight after 24 hours and of 0.2% by weight after 100 hours and a viscosity of 97 mPas at 30° C. and was dilutable in any ratio with water.

EXAMPLE 3

888.0 g of Formol 50 were uronated as in Example 1, 35.0 g of ethanolamine were then added dropwise, and the solution was stirred at 50° C. for 30 minutes. After the pH had been adjusted with calcium hydroxide solution to 8.0, 200 g of urea were added for methylolation at this pH over 60 minutes. After addition of 36 g of ethylene glycol, about 17 ml of 10% strength by weight sulfuric acid and 162.0 g of 40% strength by weight aqueous glyoxal solution, the reaction was continued for 30 minutes at a pH of 5.6, the solution was then brought to pH 4.0 with 50% strength by weight sulfuric acid, and condensation was continued at 80° C. until a sample to which 25% strength by weight magnesium sulfate solution had been added became cloudy at a mixing ratio of 1:0.8. 108.0 g of 40% strength by weight glyoxal solution and 75 g of urea were then added at pH 5.6, and the solution was stirred at 65° C. for 30 minutes. The pH was repeatedly adjusted with calcium hydroxide solution to 7.2, and the solution was filtered. 1526.0 g of the binder solution with a solids content of 63% by weight was found 24 hours later to have a free formaldehyde content of 0.25% by weight and a water thinnability of 1:2.

After 10 weeks' storage of the product at 20° C. it was found to have an unchanged pH and a water thinnability of 1:1.9 (measured on a virtually unchanged clear binder solution).

EXAMPLE 4

888.0 g of Formol 50 were uronated as in Example 1 and methylolated with 200.0 g of urea as described. Following addition of 72.0 g of diethylene glycol, the pH was adjusted with 10% strength by weight sulfuric acid to 5.0, and the solution was condensed at 85°–90° C. until a sample to which 25% strength by weight magnesium sulfate solution had been added became cloudy at a mixing ratio of 1:1.0. 270.0 g of 40% strength by weight aqueous glyoxal solution were added, and the reaction was continued at the resulting pH of 4.3 to incorporate glyoxal, indicated by increasing water solubility and decreasing viscosity. After about 75 minutes free glyoxal was no longer detectable. A sample to which 25% strength by weight magnesium sulfate solution had been added became cloudy at a mixing ratio of 1:1.8. The water solubility and viscosity were virtually unchangeable by further heat treatment.

The solution was then brought to pH 5.6 with calcium hydroxide solution and adjusted to 65° C., 65.5 g of urea were added, and the solution was stirred at 60° C. for 30 minutes. The pH was then repeatedly adjusted with calcium hydroxide solution to 7.2, and the solution was filtered.

1400 g of the binder solution with a solids content of 63% by weight was found 48 hours later to have a free formaldehyde content of 0.20% by weight and a viscosity of 145 mPas at 30° C. and to be dilutable with water in any ratio.

EXAMPLE 5

Example 4 was repeated. After the glyoxal had been added, the pH of the solution was adjusted to 5.6 with calcium hydroxide solution. The level of free formaldehyde was 2.15% by weight. 88.5 g of urea and 135 g of 40% strength by weight aqueous glyoxal solution were added, and the solution was stirred at 60° C. for 30 minutes. It was then brought to pH 7.2 with triethanolamine and filtered. The level of free glyoxal was 0% by weight. 1530 g of slightly yellow binder solution with a solids content of 62.3% by weight was found 24 hours later to have a free formaldehyde content of 0.2% by weight and a viscosity of 120 mPas at 30° C. and to be miscible with water in any ratio.

EXAMPLE 6

Example 5 was repeated. Instead of urea nothing other than 140 g of a reaction product of 640 g of dimethylolurea (Kaurit ® S), 400.0 g of water and 458 g of aqueous ammonia of 25% strength by weight were added to give a solids content of 60.5% by weight, and the pH was adjusted with 12.5 g of triethanolamine and 40 g of water. 1610 g of slightly colored binder solution having a solids content of 59.5% by weight was found 24 hours later to have a free formaldehyde content of 0.35% by weight and a viscosity of 74 mPas at 30° C. and to be miscible with water in any ratio.

TABLE

| Example | Formaldehyde emission 170° C./7 min. based on solid resin | Storage characteristics 20° C. |
|---|---|---|
| Process Example 1 | 0.33% by weight[1] | after 10 weeks slight cloudiness[2] |
| Process Example 2 | 0.48% by weight[1] | after 8 weeks slight cloudiness[2] |
| Process Example 3 | 0.25% by weight[1] | after 10 weeks slight cloudiness[2] |
| Process Example 4 | 0.37% by weight[1] | after 6 weeks slight cloudiness[2] |
| Process Example 5 | 0.21% by weight[1] | after 16 weeks slight cloudiness[2] |
| Process Example 6 | 0.23% by weight[1] | |
| Comparative Example 1 DE-C-2, 210, 283, Ex. 1 | 1.07% by weight | after 2 days cloudiness |
| Comparative Example 2 DE-C-2, 210, 283, Ex. 2 | 0.96% by weight | after 14 days cloudiness |
| Comparative Example 3 DE-C-2, 210, 283, Ex. 3 | 1.16% by weight | after 14 days cloudiness |
| Comparative Example 4 DE-C-2, 210, 283, Ex. 4 | 2.60% by weight | after 4 days cloudiness |
| Comparative Example 5 DE-A-2, 453, 250, Ex. 8 | 2.00% by weight | — |
| Comparative Example 6 Comparative Example 1 without urea in IIIrd stage C) | 2.00% by weight | — |
| Glass mat sample from Schuller, prebonded, heat treated at 170° C. for 10' | 1.00% by weight[3] | — |

[1] average of 3 measurements
[2] without impairment of the processibility
[3] based on binder Apparatus and description of method to determine the formaldehyde emitted in the curing of nonwoven binders (from Melliand Textilberichte 66 (1985), 217–222, 285–295, 363–369).

BRIEF DESCRIPTION OF THE DRAWINGS

Equipment (see Figure): jacketed tube with a slider and a cap with a spherical joint (height: 45 cm; diameter: 5.5 cm); thermometer, 100° to 250° C., 4 wash bottles with glass filter frits, thermostat with external V2A stainless steel coil heat exchanger, silicone oil AP 500 (from Wacker), aspirator, 2 dry gas meters, wringer, analytical balance, volumetric flasks, Pasteur type pipettes, sewing thread, sewing needle.

Procedure: glass mat samples from Schuller, prebonded with 5% by weight of binder (solid resin), based on web, and heat treated at 170° C. for 10 minutes, were impregnated with liquor containing the nonwoven binder (20% strength by weight) and 2% by weight of ammonium chloride, based on the solid resin, squeezed off to a wet pickup of about 20% by weight (of the solid resin), weighed and immediately condensed in the jacketed tube which had been heated with oil to about 170° C. at 170° C. for 7.0 minutes. To ensure efficient heat transfer, a hot air stream which had likewise been preheated to the desired curing temperature was passed through the tube. The nonwoven sample was hanging by a thread. At the end of the condensation time the sample was removed from the tube after actuation of the slider.

Two gas meters had been connected upstream and downstream of the tube in such a way that a nitrogen stream of about 0.5 m³/h (upstream gas meter) and 0.55 m³/h (downstream gas meter) passed through the setup. The 4 wash bottles were about half full with $H_2O$ to absorb the emitted formaldehyde. The formaldehyde entrained with the airstream was determined colorimetrically by analyzing the first 3 wash bottles together and the fourth bottle separately as a check on the completeness of absorption. The colorimetric method used was that described in Textilveredlung 8 (1973), 412–422.

We claim:

1. A process for preparing an aqueous nonwoven binder of reduced formaldehyde emission on curing that is based on a condensation product of urea, a urea derivative, or a mixture thereof, formaldehyde and glyoxal in a molar ration, based on the solid binder, of from 1.5 to 2.5 moles of formaldehyde and from 0.1 to 0.5 mole of glyoxal per mole of the total urea used, which comprises the following sequential steps:

(A) condensing urea and formaldehyde in an aqueous solution in a molar ratio of 1:(2.0–10) at a pH of from 1 to 10 and at from 20° to 95° C., then (B) condensing the condensate of step (A) with glyoxal in a molar ratio of urea: glyoxal of 1:(0.1–0.5) at a pH of from 2.0 to 6.8 and at from 60° to 100° C. and then (C) further reacting the condensate of step (B) with such an amount of urea, 2-oxo-hexahydro-1,3,5-triazine or a 2-oxo-4,6-dialkyl-hexahydro-1,3,5,-triazine in an amount, based on the solid binder, of from 2 to 20% by weight, based on the unsubstituted urea or the urea used for preparing the triazine, at a pH of from 5.0 to 8.5 and at from 20° to 100° C., and with up to 70% by weight of glyoxal, based on the total amount of glyoxal, so as to produce the stated overall molar ratio.

2. A process as claimed in claim 1, wherein in stage (A) the uronyl-free or -containing condensate is reacted with a primary alkylamine.

3. A process as claimed in claim 1, wherein triethanolamine is used to set the pH in stage (A).

4. A process as claimed in claim 1, wherein the glyoxal used in stages (B) and (C) is added portionwise.

5. A process as claimed in claim 1, wherein in stage (C) the reaction product of dimethylolurea and ammonia is used.

6. A process as claimed in claim 1, wherein in stage (C) urea is used.

7. A process as claimed of claim 1, wherein the pH in the stage (C) is set with triethanolamine, a reaction product of triethanolamine and urea or a 2-oxo-5-alkyl-hexahydro-1,3,5-triazine.

* * * * *

UNITED STATES PATENT AND TRADEMARK OFFICE
CERTIFICATE OF CORRECTION

PATENT NO. : 5,017,641

DATED : May 21, 1991

INVENTOR(S) : Fritz Kempter et al.

It is certified that error appears in the above-identified patent and that said Letters Patent is hereby corrected as shown below:

On Title page:

The Foreign Application Priority Data has been Omitted, should be, --May 7, 1988 [DE] Fed. Rep. of Germany .......... 3815724--.

Signed and Sealed this

Fifteenth Day of December, 1992

*Attest:*

DOUGLAS B. COMER

*Attesting Officer*     *Acting Commissioner of Patents and Trademarks*